US010913380B2

(12) United States Patent
Kotz

(10) Patent No.: US 10,913,380 B2
(45) Date of Patent: Feb. 9, 2021

(54) ARMREST

(71) Applicant: Maximilian Kotz, Rieden (DE)

(72) Inventor: Maximilian Kotz, Rieden (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/594,687

(22) Filed: Oct. 7, 2019

(65) Prior Publication Data
US 2020/0164780 A1 May 28, 2020

(30) Foreign Application Priority Data

Nov. 9, 2018 (DE) .......... 10 2018 008 817

(51) Int. Cl.
B60N 2/75 (2018.01)
B60N 2/02 (2006.01)

(52) U.S. Cl.
CPC .......... B60N 2/767 (2018.02); B60N 2/0232 (2013.01); B60N 2002/0236 (2013.01)

(58) Field of Classification Search
CPC ................. B60N 2/0232; B60N 2/767; B60N 2002/0236
USPC ................. 297/411.32, 411.35, 411.38, 411.3
See application file for complete search history.

(56) References Cited

U.S. PATENT DOCUMENTS

| 4,176,878 | A | * | 12/1979 | Koutsky | B60N 2/753 297/411.32 X |
| 4,968,095 | A | * | 11/1990 | Moyer | A47C 1/03 297/411.39 |
| 4,969,686 | A | * | 11/1990 | Germain | B60N 2/753 297/411.32 |
| 5,005,677 | A | * | 4/1991 | Bucholtz | B60N 2/23 188/300 |
| 7,108,318 | B2 | * | 9/2006 | Himmelhuber | B60N 2/757 297/411.32 X |
| 7,108,328 | B2 | * | 9/2006 | Himmelhuber | B60N 2/767 297/411.32 X |
| 8,516,668 | B2 | * | 8/2013 | Weber | B60N 2/793 297/411.32 X |
| 8,944,512 | B2 | * | 2/2015 | Girbinger | B60N 2/767 297/411.32 X |
| 8,950,816 | B2 | * | 2/2015 | Ott | B60N 2/753 297/411.32 |
| 9,227,538 | B2 | | 1/2016 | Girbinger | |
| 2006/0145525 | A1 | * | 7/2006 | Syrowik | B60N 2/753 297/411.32 |
| 2009/0284034 | A1 | * | 11/2009 | Nuss | B60N 2/753 296/1.07 |
| 2019/0001852 | A1 | * | 1/2019 | Tutelea | B60N 2/753 |

(Continued)

Primary Examiner — Rodney B White
(74) Attorney, Agent, or Firm — Andrew Wilford

(57) ABSTRACT

An armrest has a base, an arm support pivotable relative to the base between a first end position and a second end position, and a drive mechanism for pivoting the arm support between the first end position and the second end position and having a first formation of a first element connected to the arm support and a second formation of a second element fixed relative to the base. A coupling body engaged in the first formation and in the second formation is movable along the first formation and the second formation. A longitudinal centerline of the first formation and a longitudinal centerline of the second formation form an angle in at least one region of a movement path of the coupling body along the formations.

7 Claims, 21 Drawing Sheets

(56) References Cited

U.S. PATENT DOCUMENTS

Figure 1:
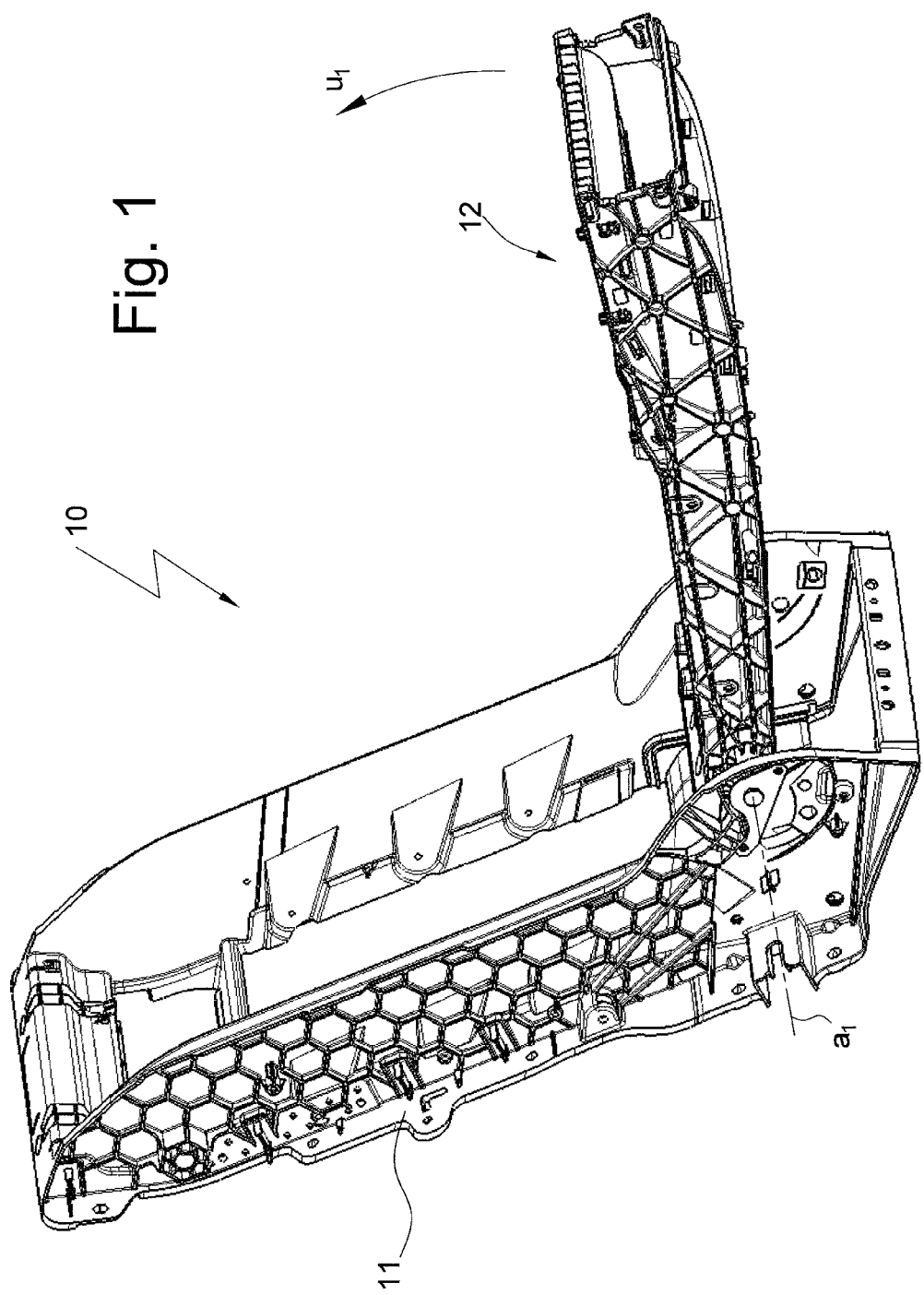

2019/0210499 A1* 7/2019 Boddenberg ............ B60N 2/757
2019/0389351 A1* 12/2019 Boddenberg ............ B60N 2/938

* cited by examiner

ARMREST

The invention relates to an armrest.

Such an armrest is known from DE 10 2013 009 956 [U.S. Pat. No. 9,227,538]. The armrest for a vehicle seat comprises a base and an arm support pivotable relative to the base about a pivot axis.

The object of the invention was to create an armrest in which the arm support of the armrest is formed to be driven pivotably.

The object was achieved by an armrest with the features of claim 1.

The armrest comprises a base and an arm support that is pivotable relative to the base between a first end position and a second end position. The armrest has a drive mechanism for pivoting the arm support. The drive mechanism comprises a motor. The motor is controllable between various operating states for example via a control actuatable by the user.

The drive mechanism comprises at least one first formation associated with the arm support in a first element and at least one second formation fixed to the base in a second element. A movable coupling body engages in the first formation and in the second formation and can be moved inside the formation from a first end region to a second end region. A longitudinal centerline of the first formation and a longitudinal centerline of the second formation form an angle in at least one region of the formation. One element can be driven in this way relative to the other element. The pitch of one formation relative to the other formation determines the ratio of power and path covered. The coupling body is guided in this case by the fixed formation and drives the movable formation.

The first formation is formed for example in a first sleeve and the second formation in a second sleeve that is concentric to the first sleeve and is fixed to the armrest. The first sleeve can be rotated about the pivot axis relative to the second sleeve by movement of the coupling body in the formation. The second sleeve is for example fixed on the base. The first sleeve is for example fixed to the arm support. The embodiment permits a space-saving construction of the drive on the rotary axis of the arm support.

The drive mechanism comprises for example a threaded spindle that drives a spindle nut, wherein the spindle nut is connected to the coupling body. The spindle forms a linear drive, with which the coupling body can be arranged in a space-saving manner—for example inside two concentric sleeves. The spindle can be driven for example by an electric motor.

The drive mechanism can comprise for example an electric motor for driving the coupling body.

The arm support is loaded for example by a spring into an end position. In particular, the spring can support for example a movement from a position of use of the arm support to a stowage position. In this way the drive only has to overcome a portion of the weight force of the arm support in movement.

The drive has for example at least one coupling that can be moved from a coupled position to a decoupled position when a resulting force between the spindle nut and the arm support is exceeded. The coupling can be formed for example between the spindle nut and the coupling body. Alternatively or in addition, the coupling can be formed between a sleeve and the arm support connected to the sleeve.

For example, a latch is provided for the arm support with which the arm support can be locked in at least one position with the base. The latch is movable between a locking position and a release position. In the locking position, at least one locking element assigned to the arm support is in engagement with at least one locking element assigned to the base. In the release position the interacting locking elements of the arm support and the base are disengaged.

The latch can be moved for example automatically from the release position to the locking position. The latch can be controlled in this case for example by the coupling body. On movement of the coupling body into an activation position, the latch, for example, moves from the release position into the locking position. So that movement of the coupling body into the activation position does not result in an undesirable movement of the arm support, the first formation and the second formation can run in one region parallel to one another.

The width of a region of the first formation assigned to the first position of the arm support and the width of a region of the second formation assigned to the first position of the arm support is formed enlarged in relation to the width of the other regions of the formations in such a way that the arm support has increased play in the pivot direction of the arm support in this region. The play can for example permit the arm support to rest on the cushion when it is unloaded or be pivoted somewhat with elastic deformation of the cushion when it is loaded.

Figure 2:
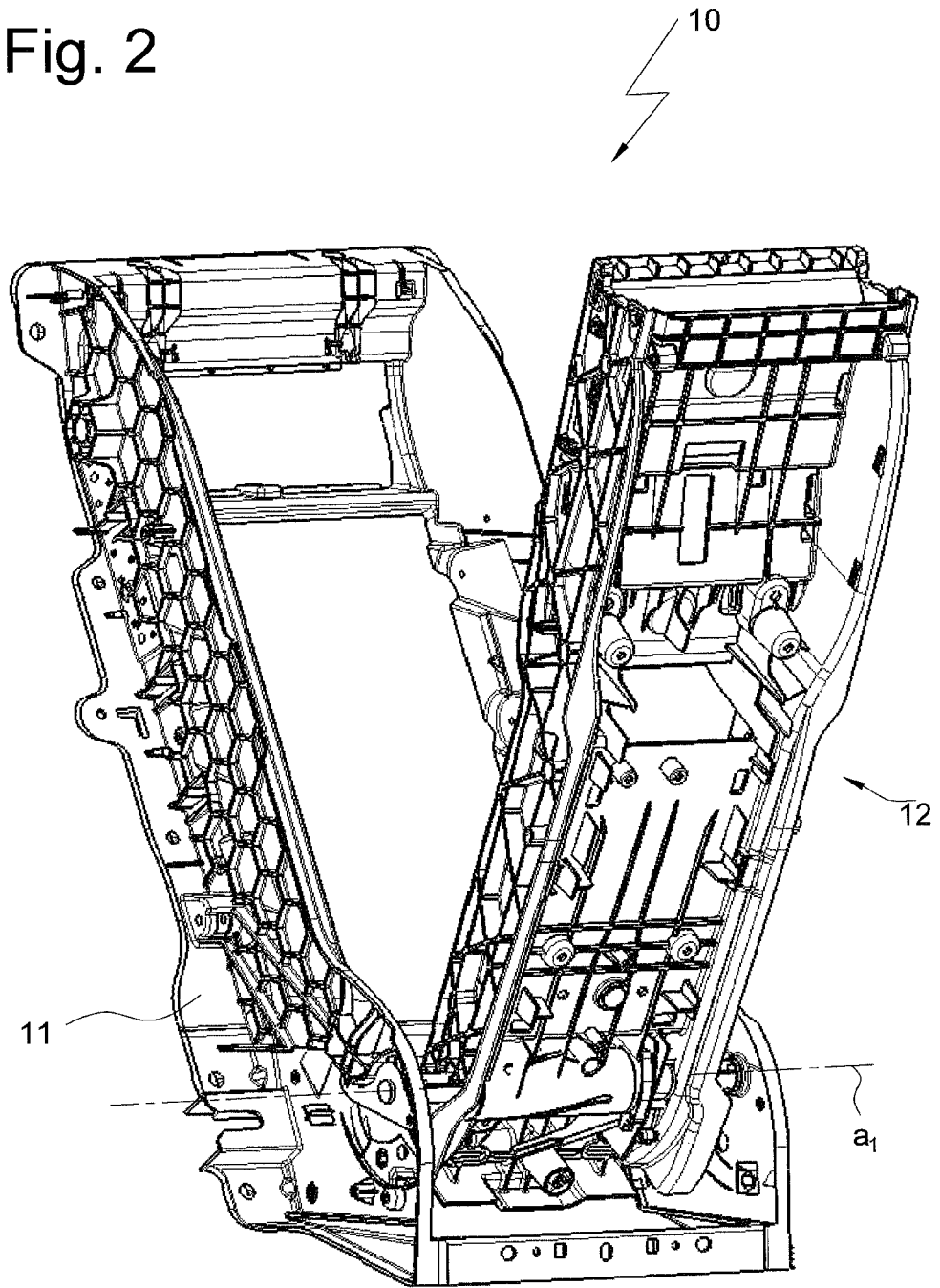
Figure 3:
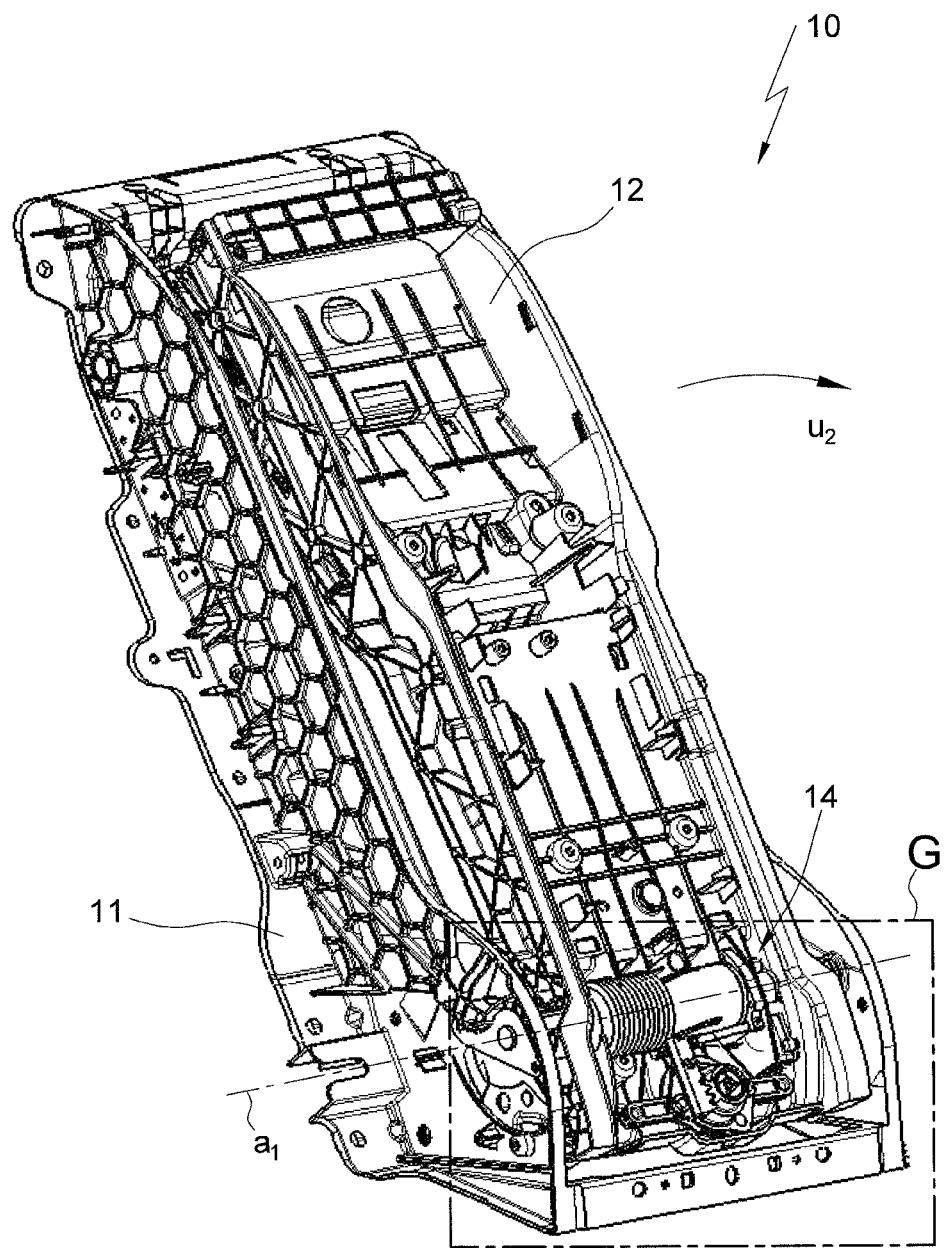
Figure 4:
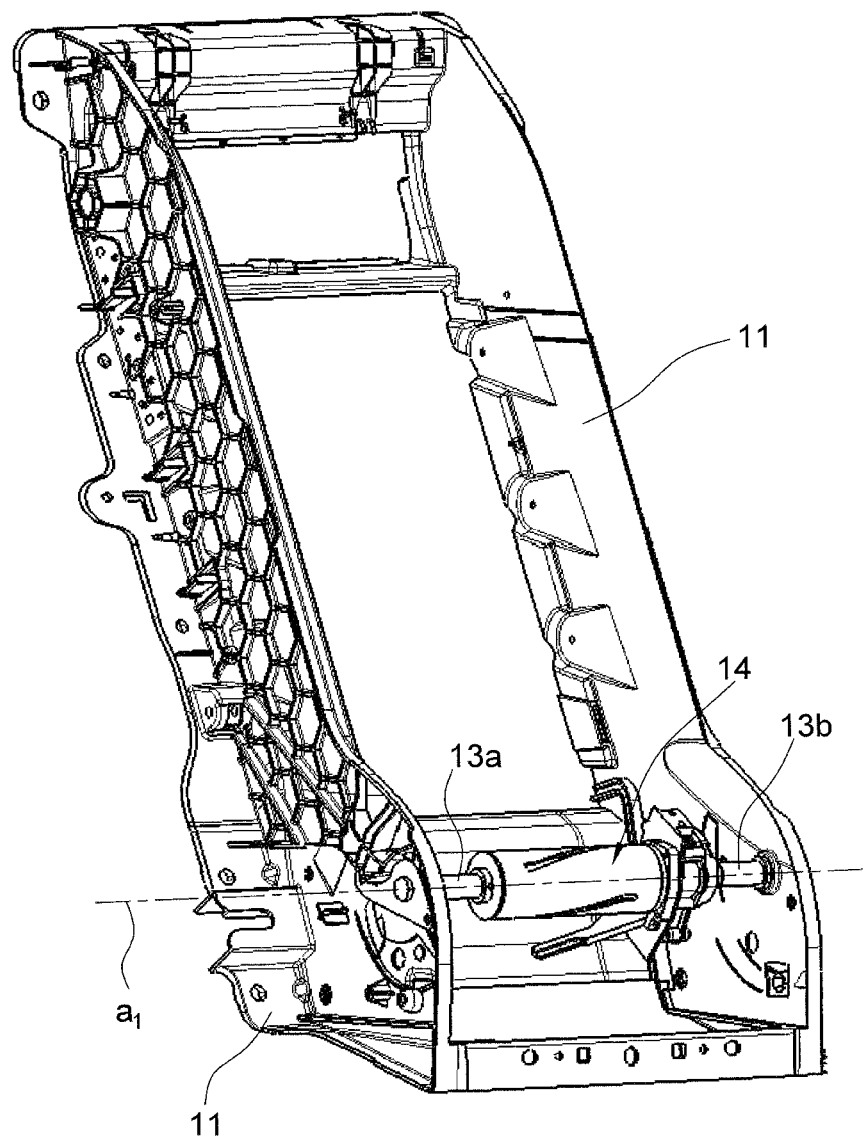
Figure 5:
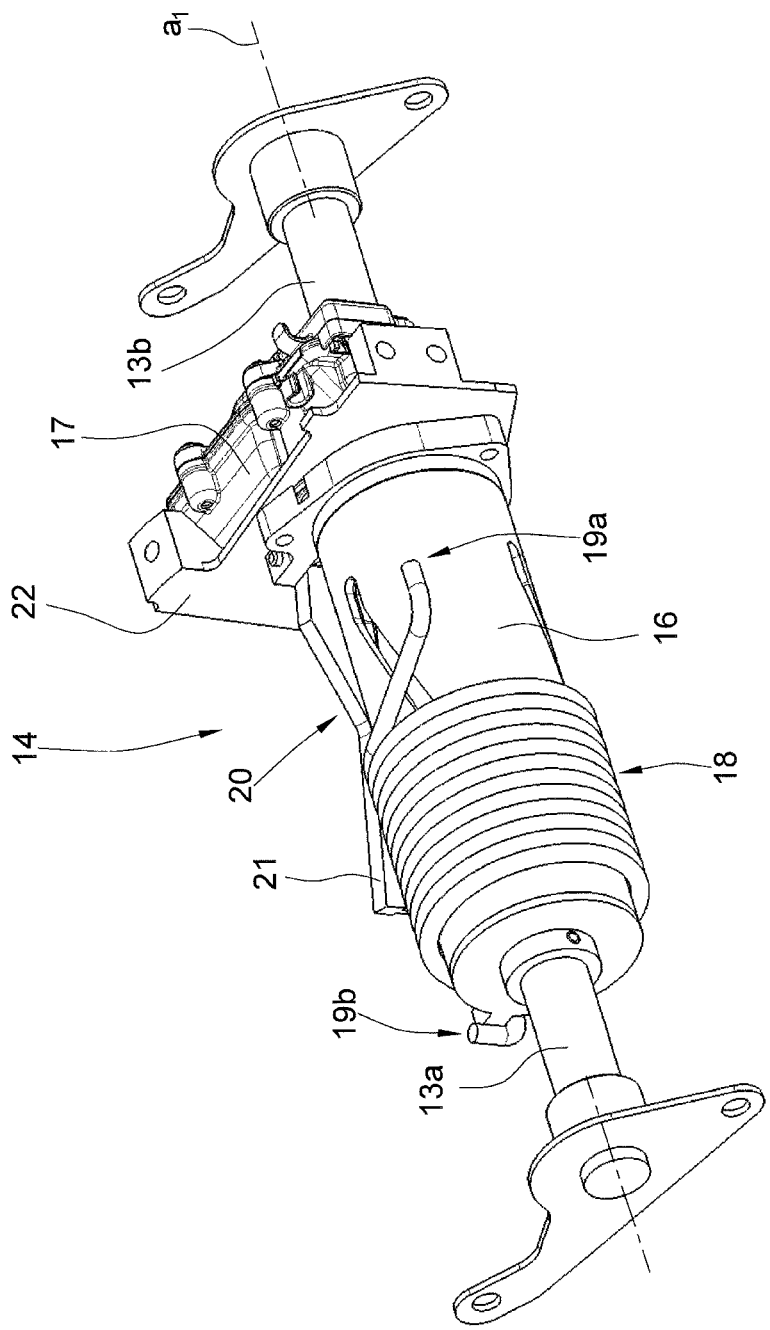
Figure 6:
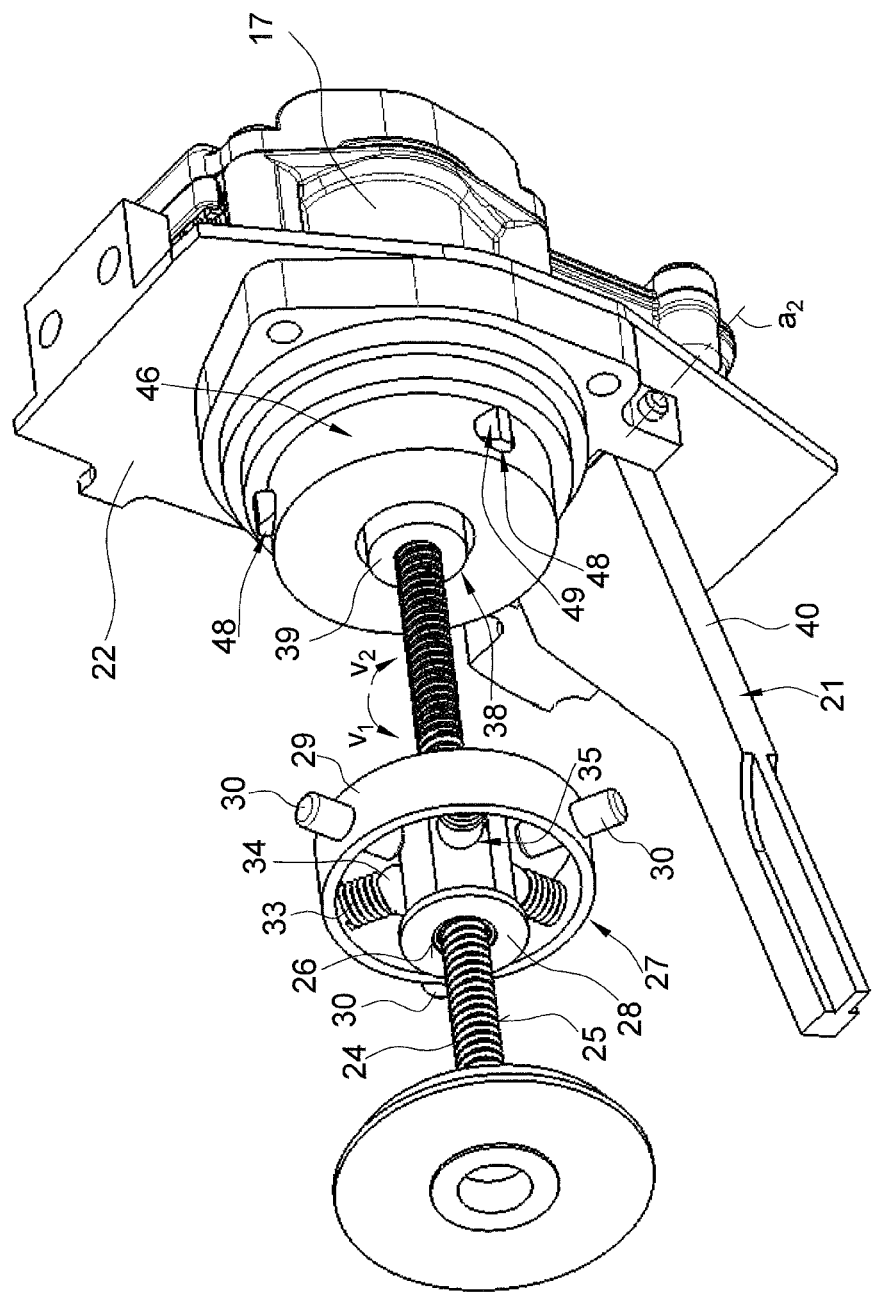
Figure 7:
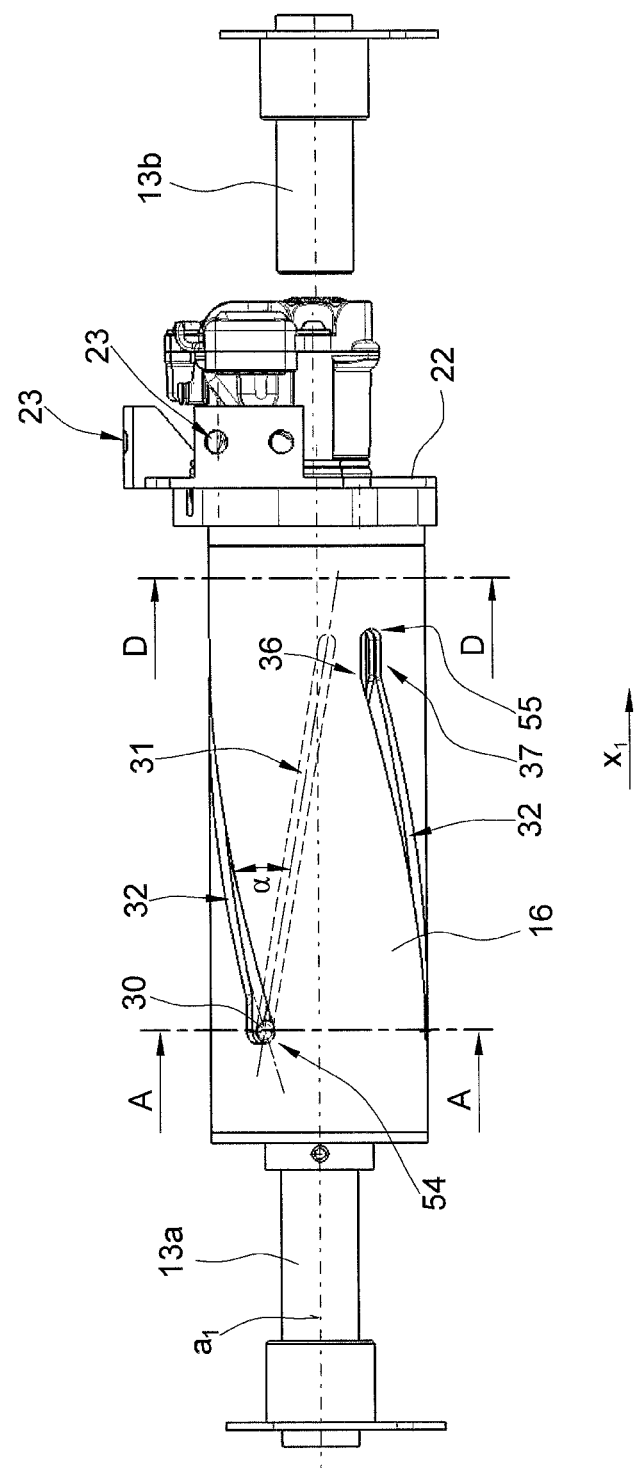
Figure 8:
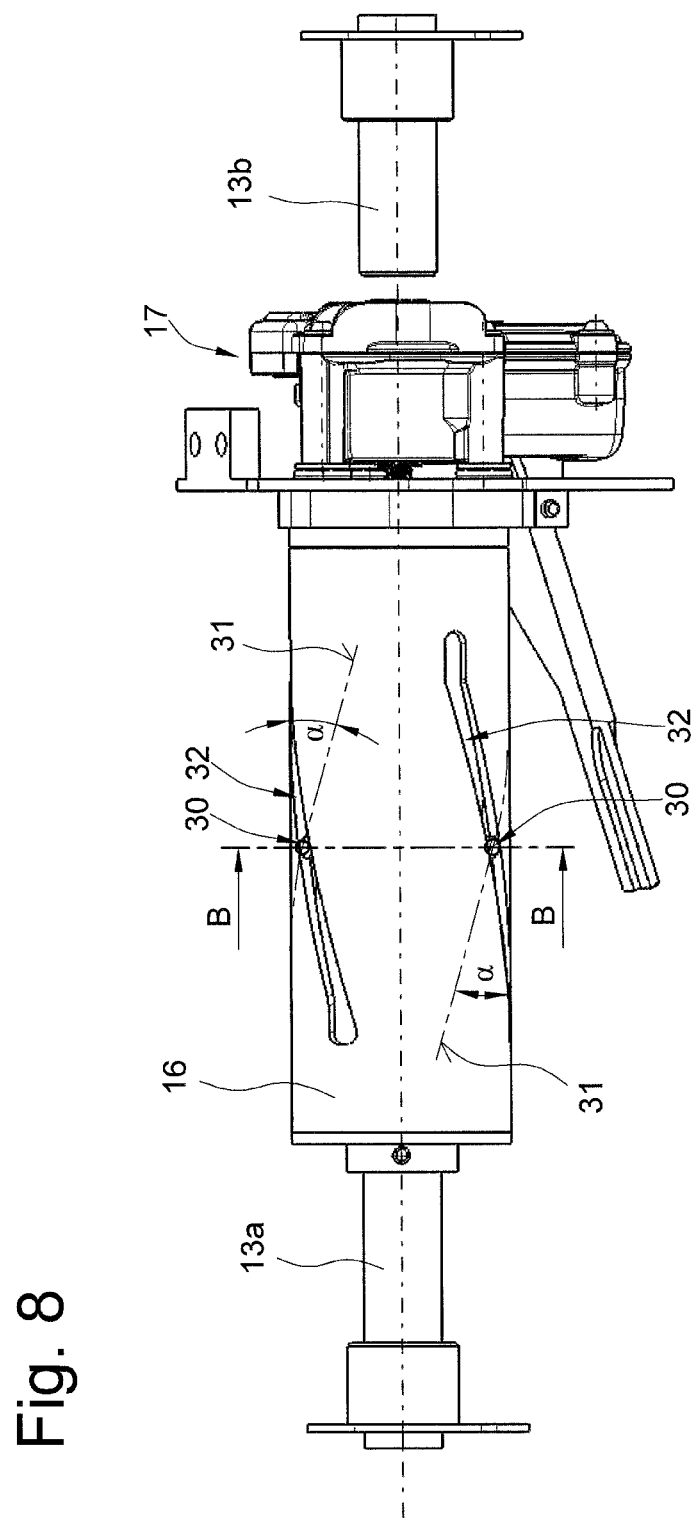
Figure 9:
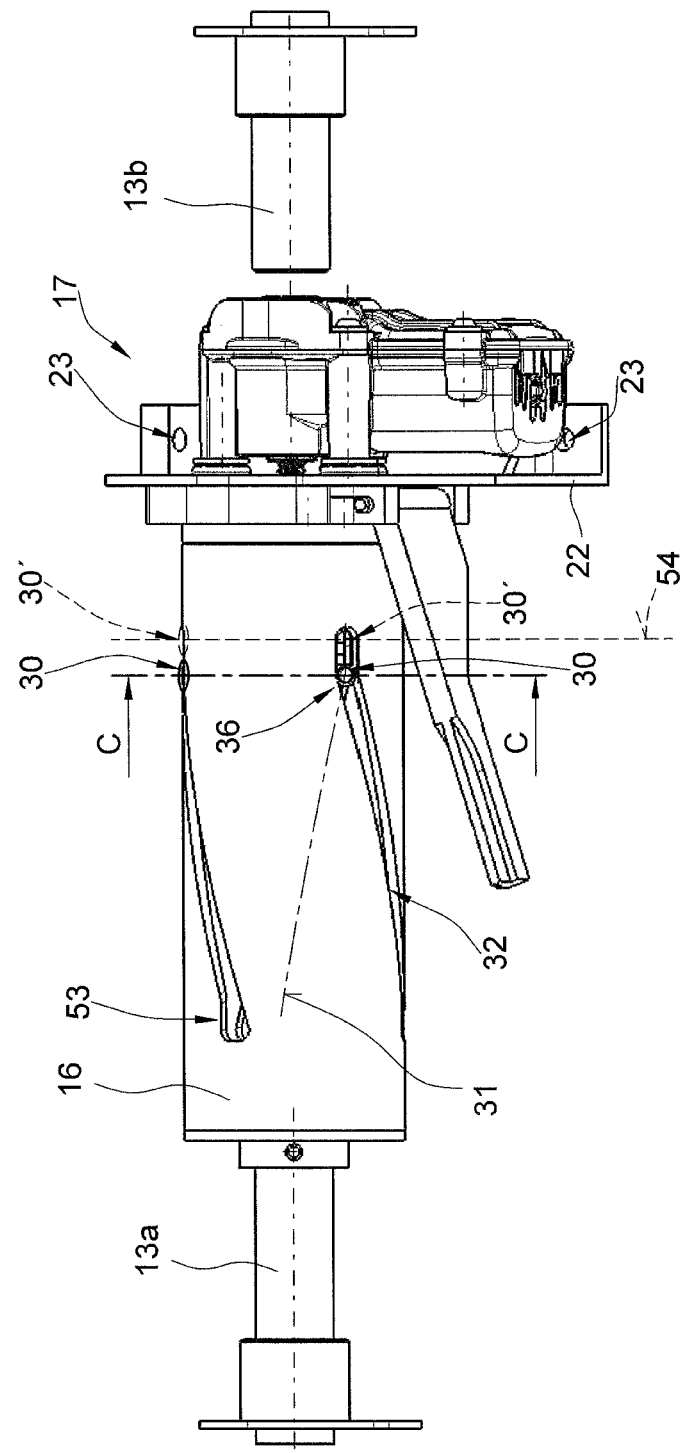
Figure 10:
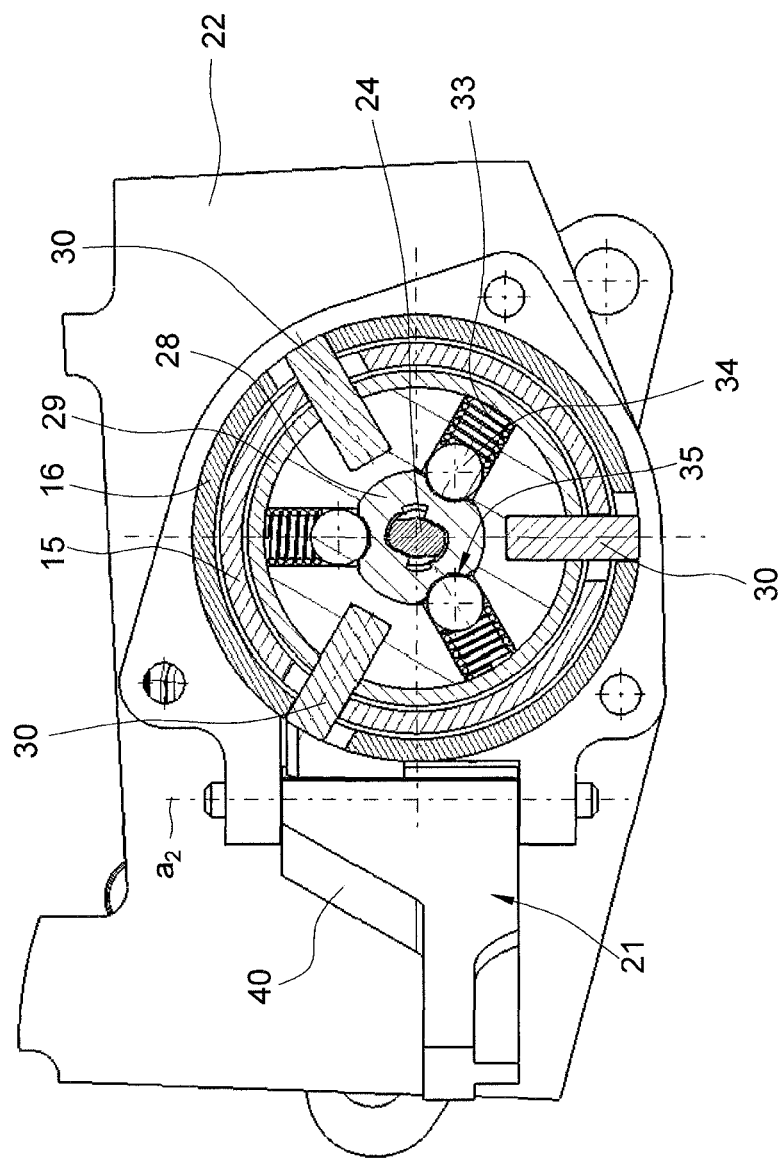
Figure 11:
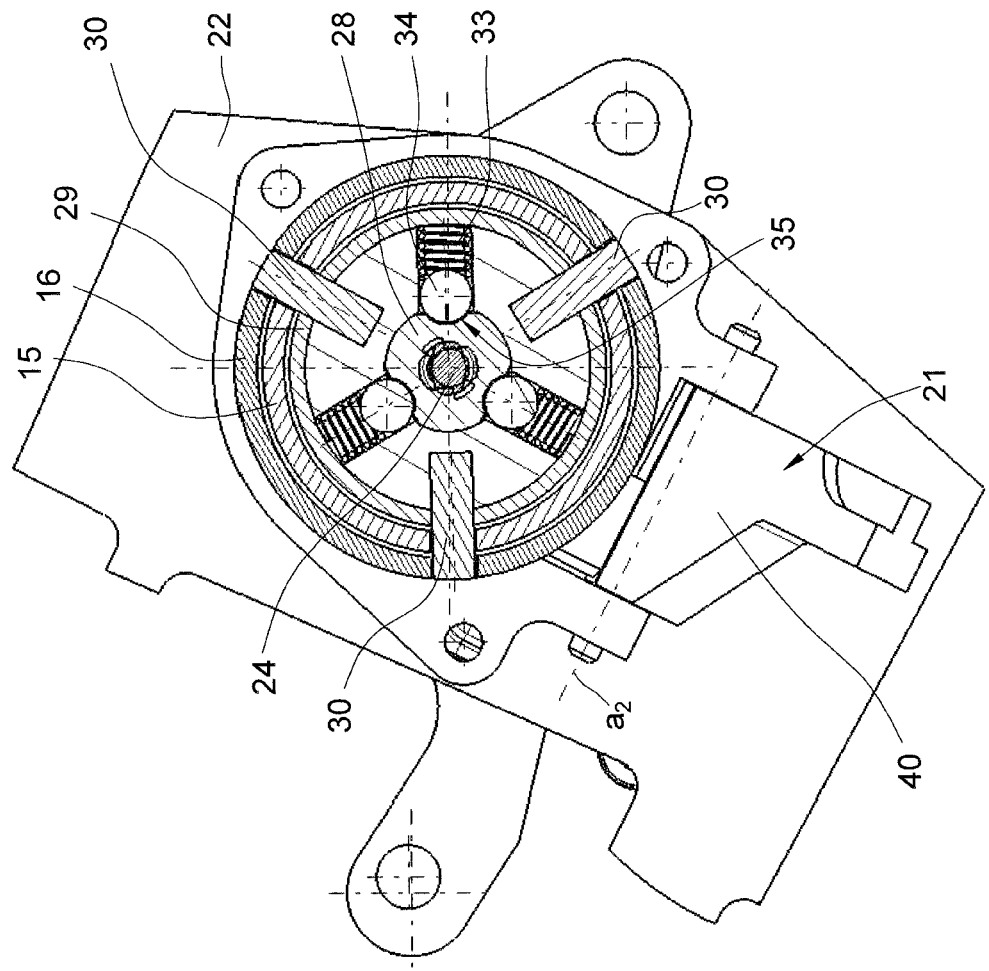
Figure 12:
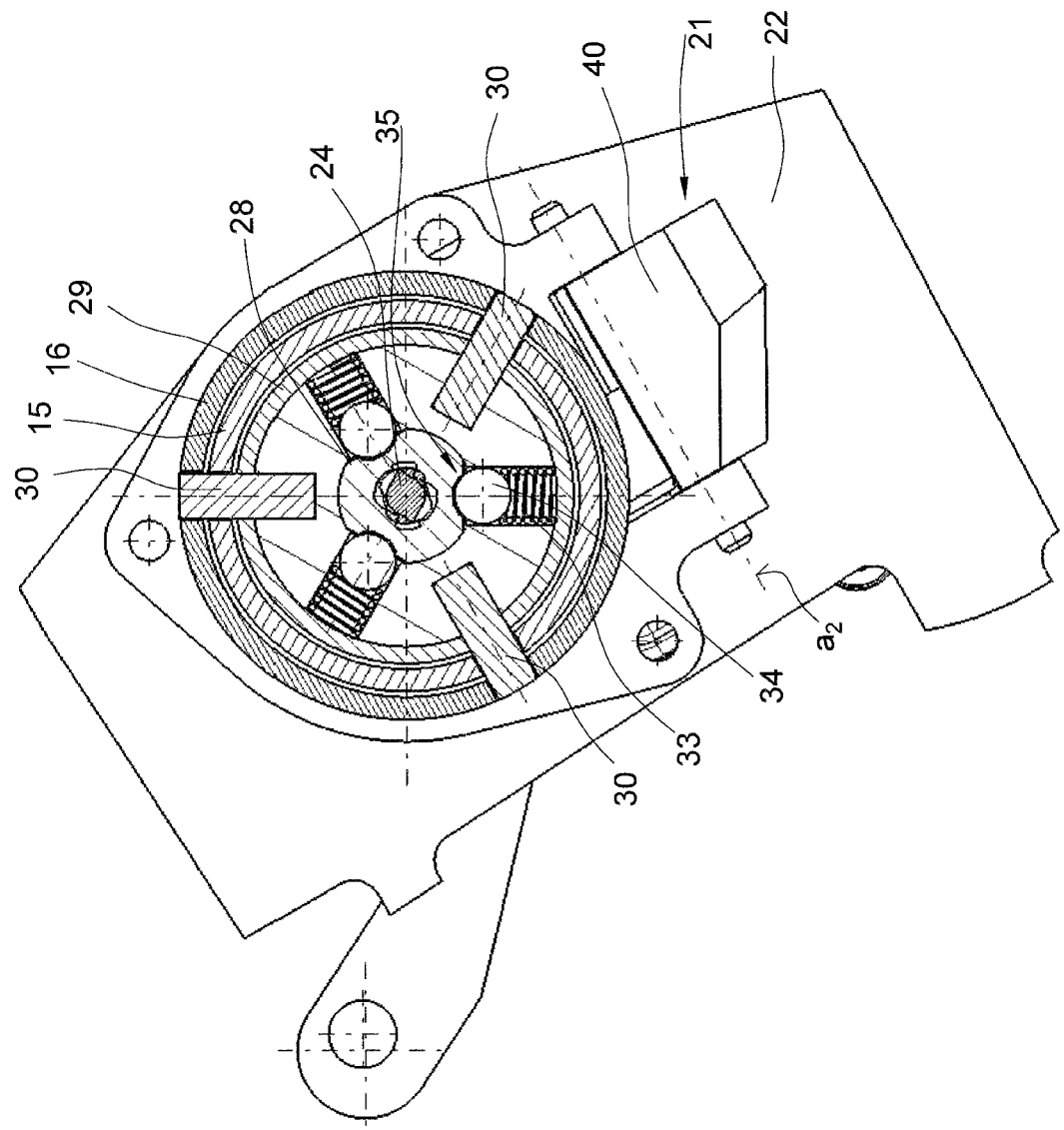
Figure 13:
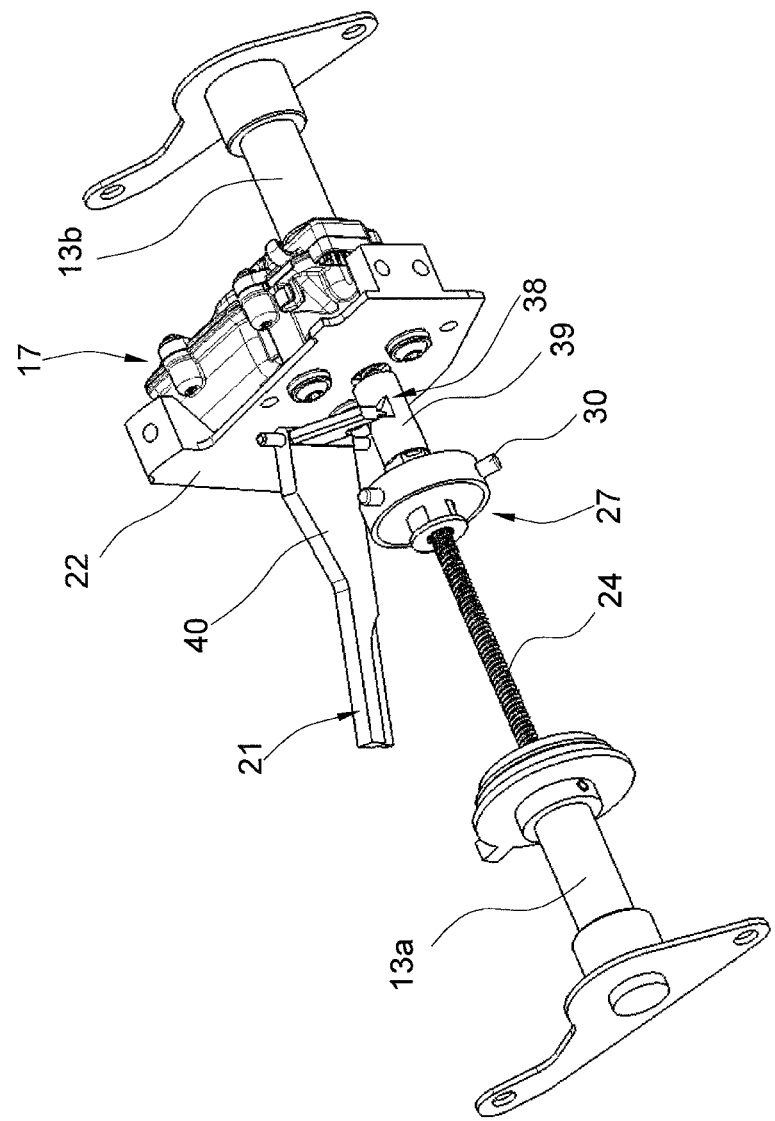
Figure 14:
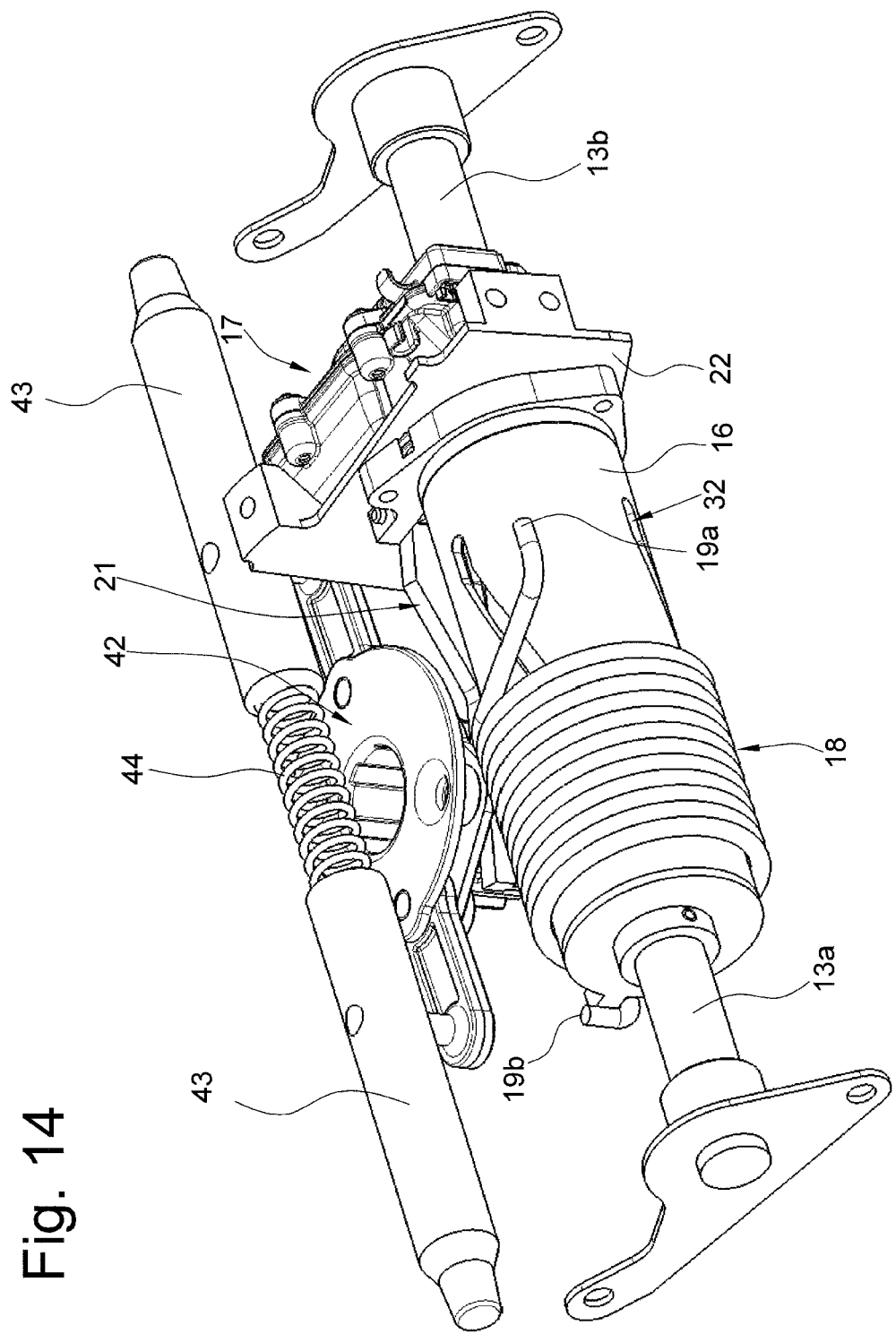
Figure 15:
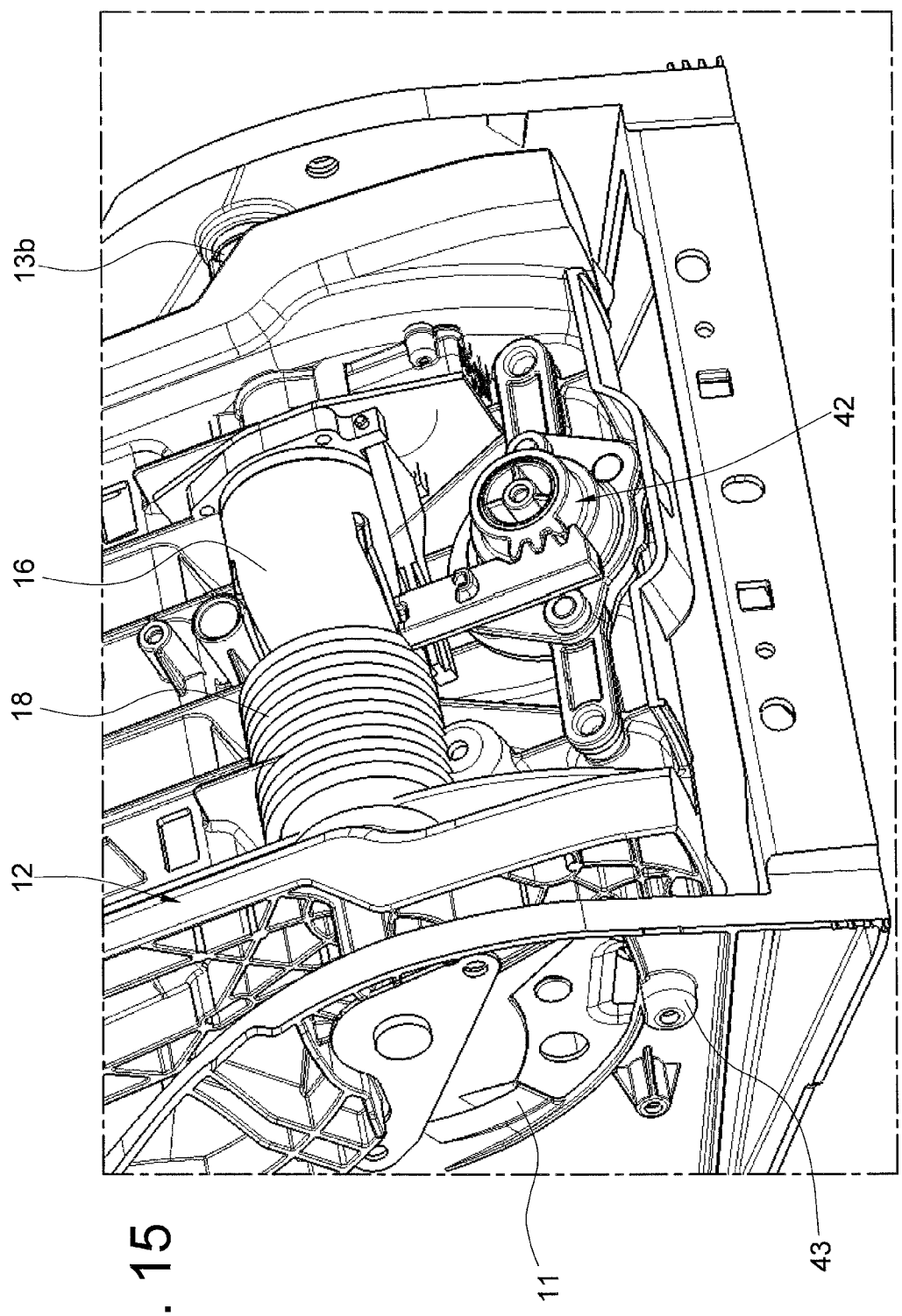
Figure 16:
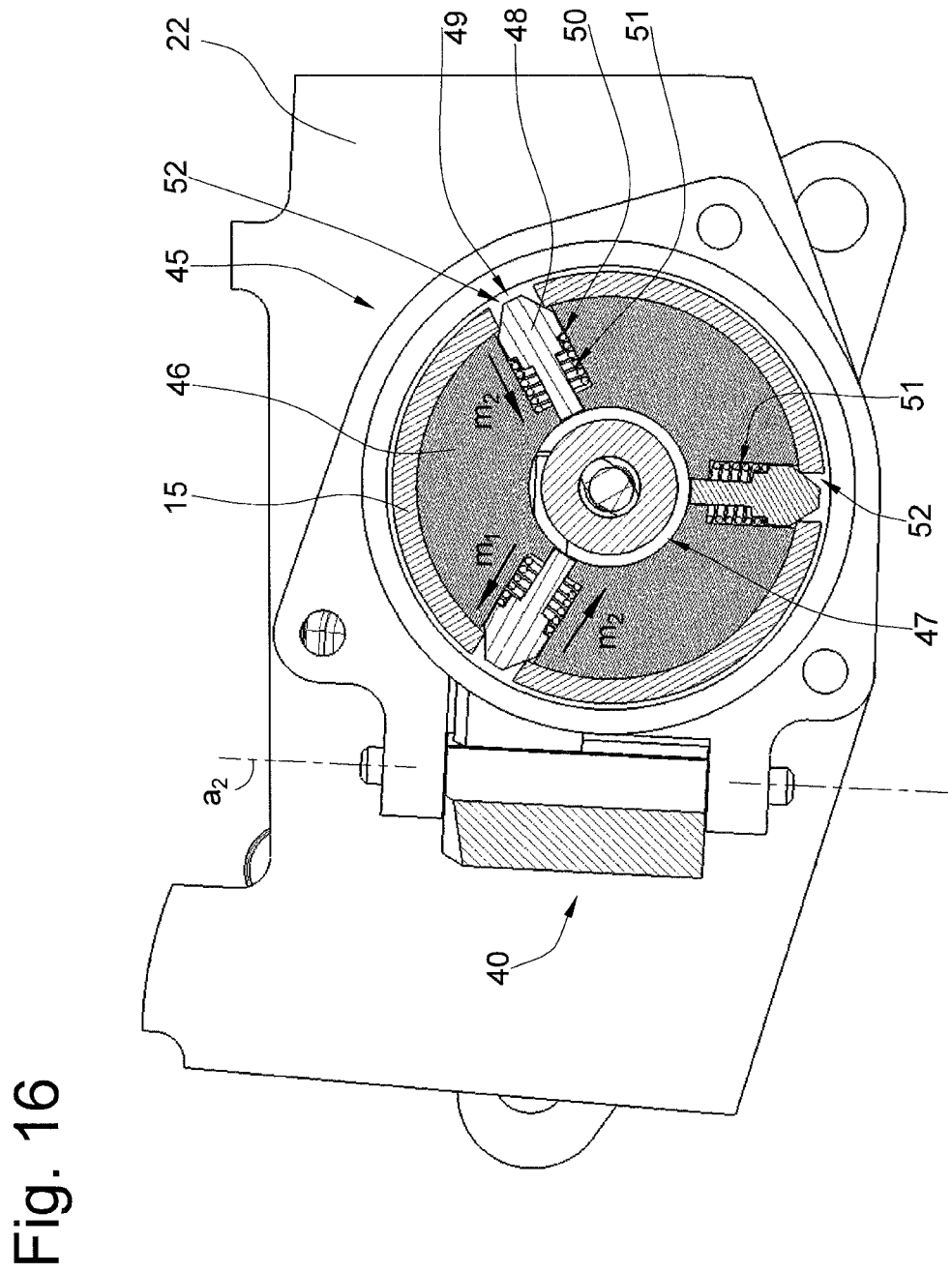
Figure 17:
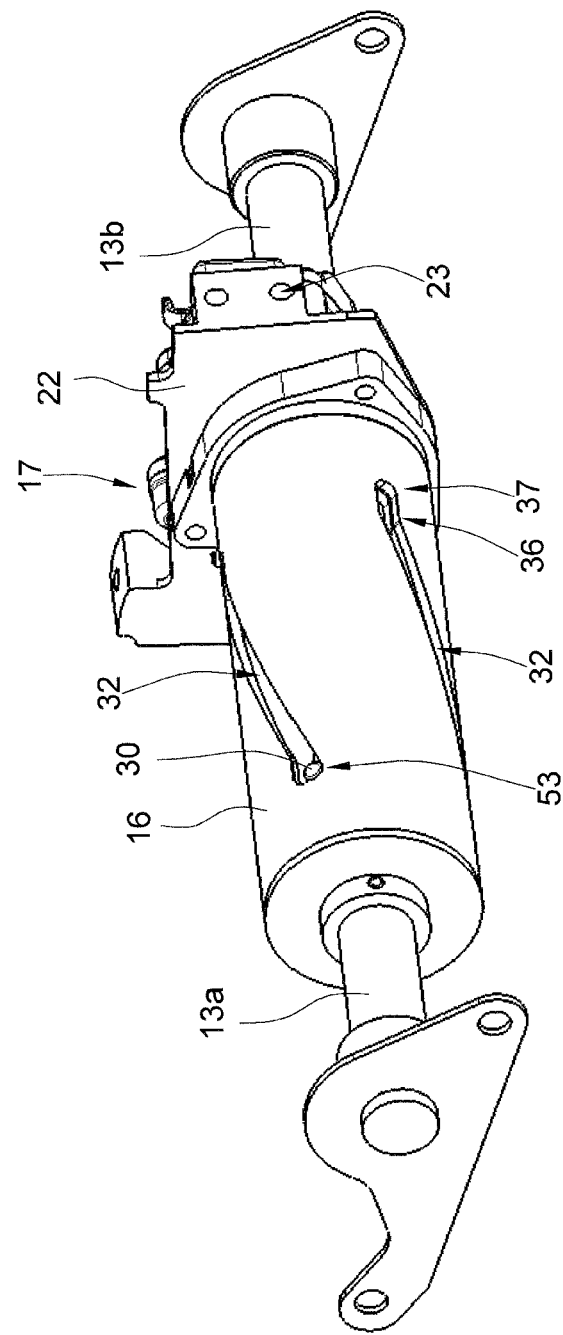
Figure 18:
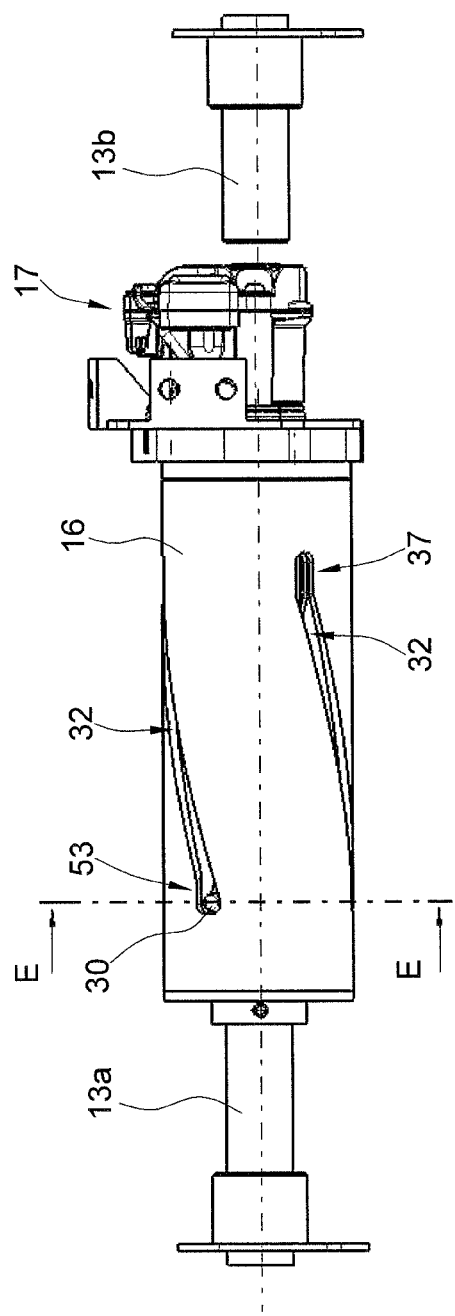
Figure 19:
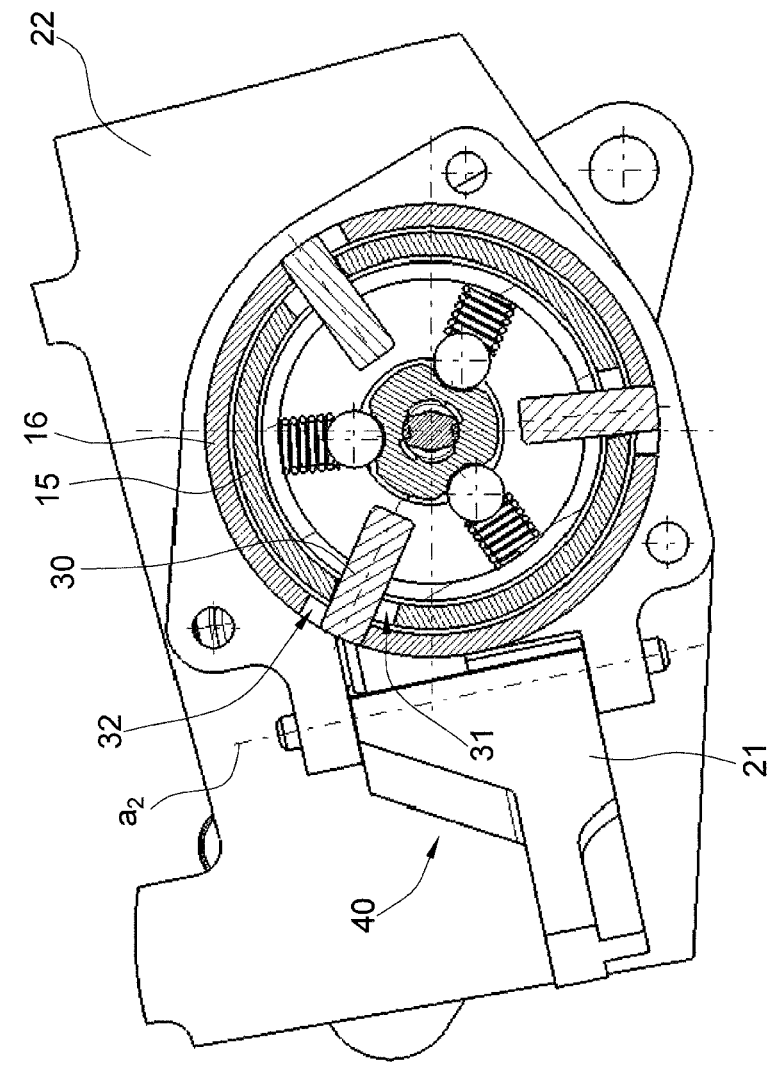
Figure 20:
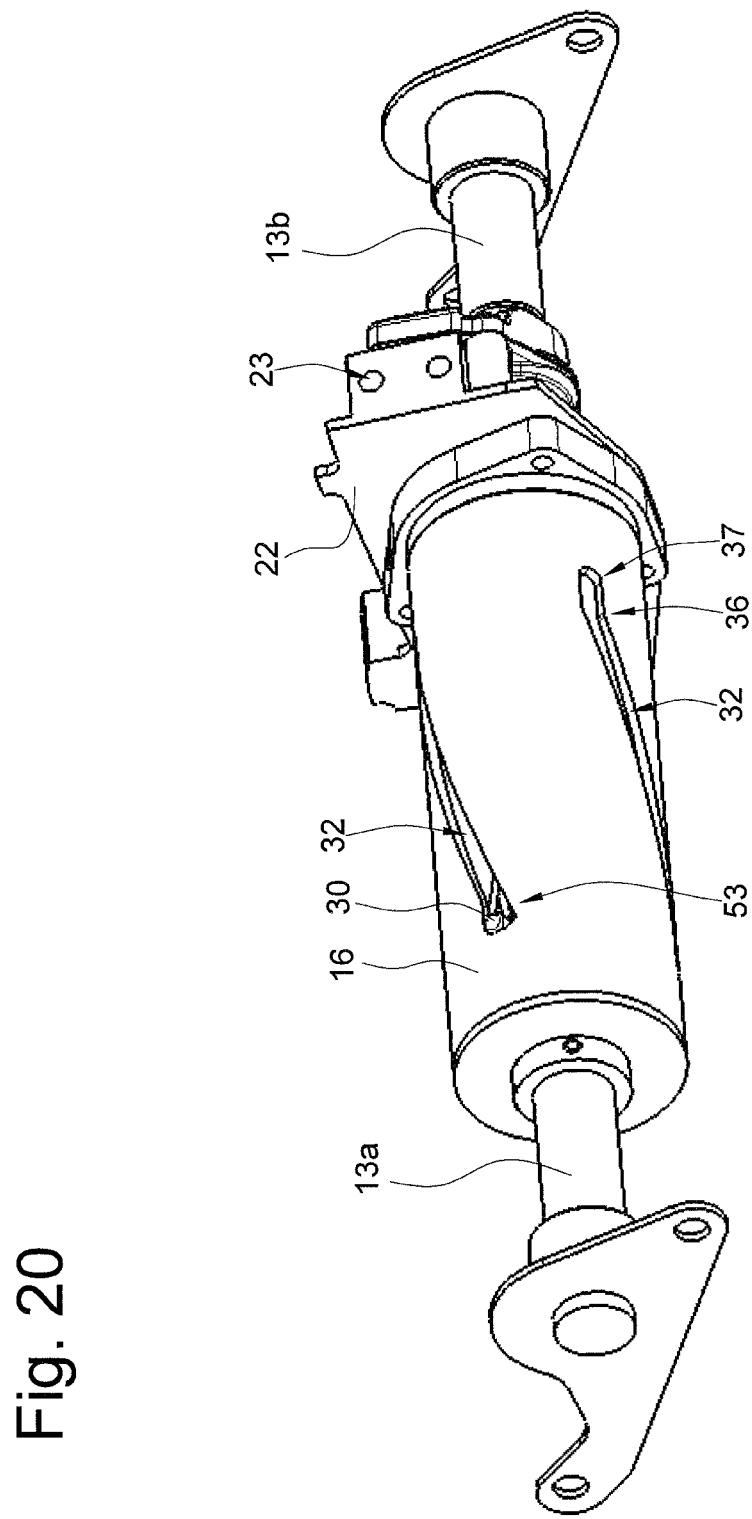
Figure 21:
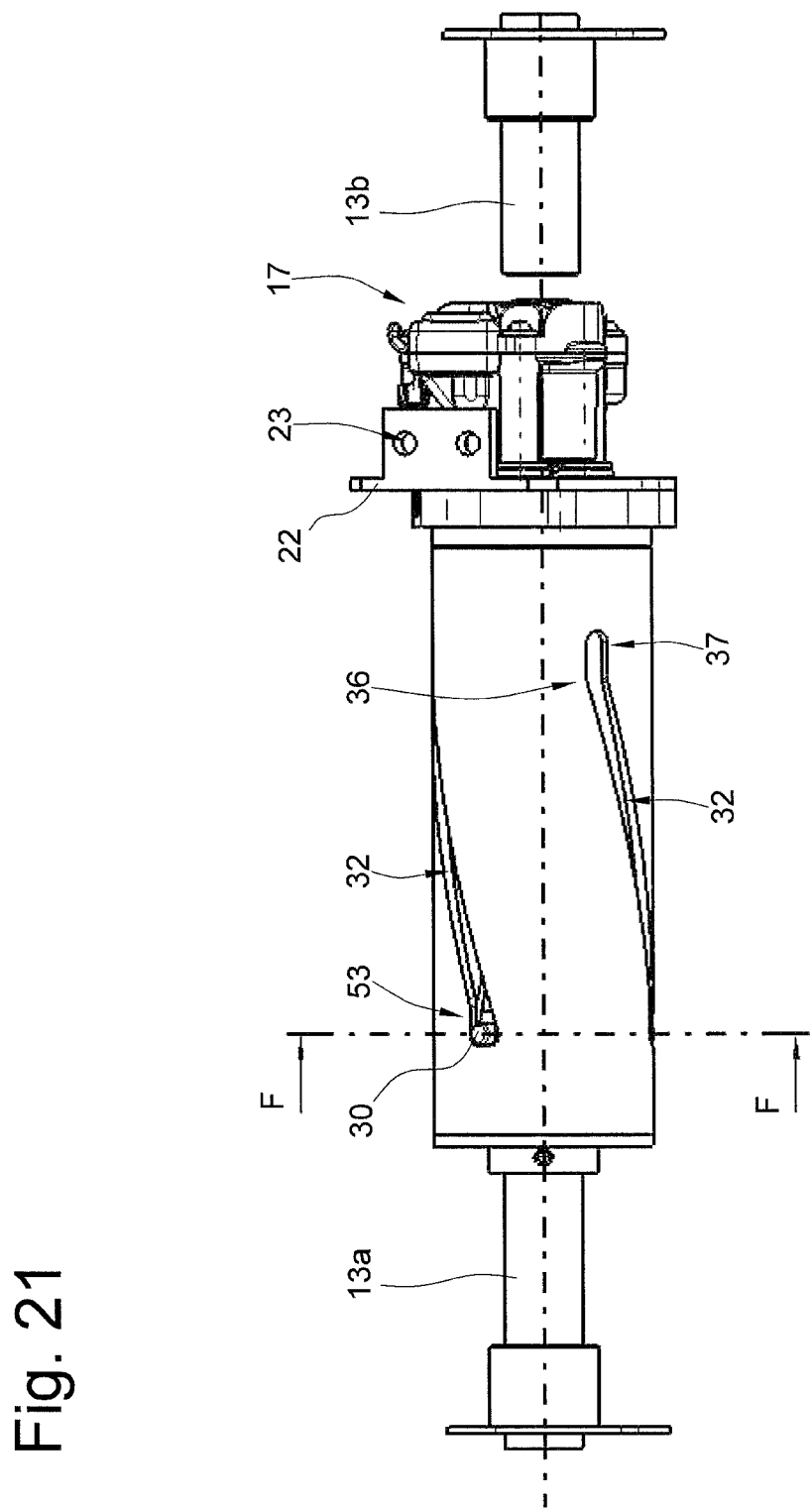

Further advantages of the invention result by means of the description of an embodiment shown schematically in the figures. Therein:

FIG. 1 shows the armrest in perspective, wherein an arm support of the armrest is located in a first position that is a position of use in the present embodiment, FIG. 2 shows the armrest in perspective, wherein the arm support is located in an intermediate position between the first position and a second position, FIG. 3 shows the armrest in perspective, wherein the arm support is located in a second position that is a stowage position in the present embodiment, FIG. 4 shows the armrest in perspective, wherein the arm support is not shown, so that a drive mechanism can be recognized, FIG. 5 shows the drive mechanism in perspective as an assembly, FIG. 6 shows the drive mechanism in perspective, wherein sleeves of the drive mechanism are not shown, FIG. 7 is a view of the drive mechanism from the front, wherein the arm support is in the first position, FIG. 8 like FIG. 7 is a view of the drive mechanism from the front, wherein the arm support is in the intermediate position, FIG. 9 following FIG. 7 is a view of the drive mechanism from the front, wherein the arm support is in the lockable position, FIG. 10 a sectional view according to section line A-A in FIG. 7, FIG. 11 a sectional view according to section line B-B in FIG. 8, FIG. 12 a sectional view according to section line C-C in FIG. 9, FIG. 13 shows the drive mechanism in perspective in the second position, wherein the sleeves are not shown, FIG. 14 shows the drive mechanism in perspective with a part of the latch, FIG. 15 a large-scale view of section G in FIG. 3, FIG. 16 a sectional view according to section line D-D in FIG. 7, FIG. 17 shows the drive mechanism in perspective in the first position, wherein the position of the arm support—for example from a cushion—is defined upward, FIG. 18 is a view of the drive mechanism from the front according to FIG. 16, FIG. 19 is a sectional view according to section line F-F in FIG. 21, FIG. 20 shows the drive mechanism in perspective in the position of use, wherein the arm support rests for example on the seat cushion before reaching the lower position, FIG. 21 is a view of the drive mechanism from the front according to FIG. 20.

An armrest is designated as a whole by the reference 10 in the figures. The same references in the different figures describe corresponding parts, even if small letters are appended or omitted.

The armrest 10 comprises a base 11 and an arm support 12. The arm support 12 is supported pivotably on the base 11 about a pivot axis $a_1$ in the directions $u_1$ and $u_2$ between a first end position (see FIG. 1) and a second end position (see FIG. 3). From the first end position according to FIG. 1 the arm support 12 can be moved in direction $u_1$ into the second end position or into an intermediate position between the first end position and the second end position. From the second end position the arm support 12 is pivotable in direction $u_2$ into the first end position or into an intermediate position. The first end position in this case is a position of use and the second end position in this embodiment is a stowage position. An intermediate position of the arm support 12 between the first end position and the second end position is shown in FIG. 2. The arm support can be adjustable into other positions.

The pivot axis $a_1$ is formed by pins 13a and 13b (see for example FIG. 4) that are fixed on the base 11. The arm support 12 is supported pivotably on the pins 13a and 13b.

The armrest 10 comprises a drive mechanism 14 for the arm support 12 (see FIG. 4). The drive mechanism 14 according to FIG. 5 comprises a fixed circular cylindrical sleeve 16 that is fixed to the pin 13a, and a sleeve 15 (the sleeve 15 is not recognizable in FIG. 5) that is coaxial with the sleeve 16 and arranged radially inside the sleeve 16. The sleeve 15 is fixed to the arm support 12 via a retaining element 22 that is connected to the sleeve 15 in terms of movement, and is supported movably relative to the sleeve 16.

In FIG. 5 a motor 17 can also be recognized that is likewise fixed on the arm support 12. A spring 18 is fixed by one end 19b on the base 11. An end 19a biases the arm support 12 into the stowage position. Furthermore, an actuating arm 21 of a latch 20 can be seen in FIG. 5. The sleeve 15 is fixed to the retaining element 22 via the hollow cylinder 46. The retaining element 22, which acts as a support for the sleeve 16, is attached to the arm support 12. Holes 23 for a screw attachment, which is not shown, are provided on the retaining element 22 for this.

According to FIG. 6 the drive mechanism 14 comprises a spindle 24 that is driven by the motor 17 and is movable in the directions $v_1$ and $v_2$, with a thread 25 that engages in a thread 26 of a spindle nut 28 in a coupling assembly 27 (not shown). The coupling assembly 27 comprises the spindle nut 28 and a ring 29 arranged concentrically to this. Held on the ring 29 are coupling bodies 30 that are distributed over the circumference and are formed in this embodiment as pins that project radially outward above the ring 29.

In the present embodiment the coupling bodies 30 are arranged offset by around 120° over the circumference of the ring 29. Each coupling body 30 engages in a formation 31 in the first sleeve 15 and in a formation 32 in the second sleeve 16 (the formations 31 and 32 are not recognizable in FIG. 6).

Three formations 31 are accordingly formed in the first sleeve 15 and three formations 32 are likewise formed in the second sleeve 16. According to an alternative implementation, however, for example only one formation pin, two formation pins or four formation pins could also be connected to the ring 29 and interact with a corresponding number of formations in the sleeve 15 and the sleeve 16.

Also supported on the ring 29 are springs 33 that each load a pressure piece 34, for example a ball, radially in the direction $p_1$ in a seat 35 of the spindle nut 28. Contrary to the depiction, each spring 33 can be guided by means of a sleeve. An overload coupling, for example an anti-trap protection function, is formed in this way, which decouples when a maximum axial force between the spindle nut 28 and the remaining elements of the coupling assembly 27 is exceeded, i.e. the balls 34 move contrary to the force of the springs 33 in the direction $p_2$ out of the seat 35 and the spindle nut 28 can move relative to the ring 29 axially in one of the directions $x_1$ or $x_2$.

The formation 31 (the formation 31 is only indicated in the form of a dashed line) and the formation 32 can be recognized in FIG. 7. The formations 31 and 32 diverge and form for example an angle α. The angle α does not have to be constant over the entire length of the formation. The angle α depends on how the movement characteristic of the arm support 12 is to be designed. In this way the first sleeve 15 is rotated relative to the second sleeve 16 on movement of the formation pin 30 in the direction $x_1$ along the formations 31 and 32, wherein the arm support 12 is pivoted in the direction $u_1$ in the direction of the second end position (see FIGS. 7-12).

FIGS. 7 and 10 show a position of the formation pin 30 at a first end region 54 of the formation 32, in which the arm support 12 is located in the first position. According to FIGS. 8 and 11 the formation pin 30 is arranged between the end regions of the formations 31 and 32. The arm support 12 is located in an angled position between the first position and the second position. As soon as the formation pin 30 has reached the point 36 (see FIGS. 9 and 12), the arm support 12 is located in the second position.

The formations 31 and 32 run parallel to the pivot axis $a_1$ in a region 37. This has the function that during movement of the coupling body 30 at an end region 55 of the formation 32, an actuating device 38 (see FIG. 13) of the latch 20 can be actuated without pivoting the arm support 12 at the same time. The actuating device 38 comprises a sleeve 39 that is coaxial with the spindle 24 and can be moved by the spindle nut 28 on the spindle 24 in the directions $x_1$ and $x_2$. On movement of the sleeve 39, a two-armed lever 40 is actuated that is supported pivotably about an axis a2 on a physical shaft 41.

The lever 40 comprises the actuating arm 21 (see FIGS. 13 and 14) with which a transfer mechanism 42 can be actuated that for its part releases two locking bolts 43, so that these are moved by a spring 44 into a locking position in which they are in engagement with an opening in the wall of the base 11 (see FIG. 15) and thereby lock the arm support 12. According to an alternative implementation, such locking could even be additionally possible in the first position in this way.

An overload safety device 45 is shown in FIG. 16. This comprises a hollow cylinder 46 (see FIGS. 6 and 16) which is inserted into an end face of the sleeve 15 and is coaxial with this. The hollow cylinder 46 has a recess 47, through which the spindle 24 engages. In the hollow cylinder 46, bolts 48 with wedge-shaped tips 49 are guided radially movably in a bore 50. The bolts 48 are each loaded radially by a spring 51 in the direction $m_1$. In the present embodiment three bolts 48 distributed over the circumference of the hollow cylinder 46 are taken up in this way. The springs 51 load each bolt 48 into a recess 52 of the sleeve 15.

If for example the arm support 12 is overloaded by applying a force tangentially to the pivot axis, when a maximal torque is exceeded the bolts 48 recoil radially out of the recesses 52 in the direction $m_2$ contrary to the spring force of the springs 51, so that the sleeve 15 can rotate relative to hollow cylinder 46 connected to the arm support 12. The bolt 48 is loaded by the spring 51 in the direction $m_1$, so that the bolt can snap into the recess 52 again.

A region 53 (see FIG. 17) of the formations 31 and 32 in which the formation pin 30 is located in the first position is formed enlarged in a circumferential direction compared with the other regions. It is hereby achieved that the arm support 12 can have play in the first position. In the event of loading of the arm support 12 from above such that a torque is generated in the direction $u_2$, the formation pin 30 rests at a first end of the region 53 of the formations 31 and 32 in the circumferential direction of the sleeve 16 (see FIGS. 17 to 19). When the load on the arm support 12 is relieved, the arm support 12 rests for example loosely on the cushion of the seat and is loaded upward by the cushion such that a torque in the direction $u_1$ acts on the arm support 12. The formation pin 30 is adjacent in this case to a second end of the region 53 in the circumferential direction of the sleeve 16 (see FIGS. 20 to 21).

The function of the armrest 10 is described below. If a control device, which is not shown, is actuated by the user such that the arm support 12 moves from the first position according to FIG. 1 to the second position according to FIG. 3, this activates the motor 17. The motor 17 drives the spindle 24 such that the spindle nut 28 moves along the spindle 24 in the direction $x_1$.

Due to the diverging formations 31 and 32 the sleeve 15 is rotated relative to the sleeve 16 in the direction $u_1$, wherein the arm support 12 fixed to the sleeve 15 also pivots in the direction $u_1$. The pivot movement of the arm support 12 is supported by the spring 18 that biases the arm support 12 in the direction $u_1$.

If for example during movement a body part of the user is trapped by the arm support 12, the coupling assembly is blocked by this. An axial force is created between spindle nut and coupling assembly. If a threshold value is exceeded, the pressure pieces 34 are moved in the direction $p_1$ out of their seat 35, so that the spindle nut 28 moves along the axis x relative to the coupling assembly 27 with the ring 29 in the direction $x_1$ or $x_2$.

If the motor 17 is stopped in an intermediate position between the first position and the second position of the arm support 12, the arm support 12 remains in the set position due to the self-locking effect of the drive mechanism 14. If a great load is applied to the arm support 12 in this position, a torque arises in the sleeve 15 that is transmitted via the formation pins 30 to the sleeve 15. If the torque exceeds a permissible value the bolts 48 move (see FIG. 6) radially inward in the direction $m_1$ and permit a rotary movement of the sleeve 15 that is stopped in normal operation on the hollow cylinder 46.

In a movement of the formation pins 30 in the direction $x_1$ as far as a point 36 of the formations 31 and 32, the arm support moves into the second position. In a further movement of the spindle nut 28 in the direction $x_1$, the actuating device 38 of the latch 20 is actuated, so that the arm support 12 is locked in the second position.

In a movement of the spindle 24 in the opposite direction of rotation and a resulting movement of the spindle nut 28 in the direction $x_2$, unlocking of the latch 20 takes place first. The arm support 12 is pivoted from the point 36 in the direction $u_2$. When the coupling bodies 30 have arrived at the end region 54, the arm support 12 is in the first position again.

The invention claimed is:

1. An armrest comprising:
   a base;
   an arm support pivotable relative to the base between a first end position and a second end position;
   a drive mechanism for pivoting the arm support between the first end position and the second end position and having a first formation of a first element connected to the arm support and a second formation of a second element fixed relative to the base;
   a coupling body engaged in the first formation and in the second formation and movable along the first formation and the second formation, a longitudinal centerline of the first formation and a longitudinal centerline of the second formation forming an angle in at least one region of a movement path of the coupling body along the formations.

2. The armrest according to claim 1, wherein the first element is formed by a first sleeve and that the second element is formed by a second sleeve concentric to the first sleeve.

3. The armrest according to claim 1, wherein the drive mechanism comprises a spindle with a thread that engages with a thread of a spindle nut and drives the spindle nut, wherein the coupling body is connected to the spindle nut.

4. The armrest according to any one claim 1, Wherein a spring biases the arm support into one of the end positions.

5. The armrest according to claim 1, wherein the drive mechanism has at least one coupling that is movable from a coupled position to a decoupled position when a resulting force between the spindle nut and the arm support is exceeded.

6. The armrest according to claim 1, further comprising:
   a latch provided for the arm support with which the arm support can be locked in at least one position.

7. The armrest according claim 1, wherein a width of a region of the first formation associated with the first position of the arm support and a width of a region of the second formation associated with the first position of the arm support are enlarged in relation to a width of other regions of the formations such that the arm support has an enlarged play in a pivot direction of the arm support in the region associated with the first position.

* * * * *